May 2, 1961 F. J. FONTANA 2,981,969
CASTER GUARD
Filed Sept. 17, 1958

INVENTOR
Frank J. Fontana

By *A. G. Douvas*

Attorney

United States Patent Office 2,981,969
Patented May 2, 1961

2,981,969
CASTER GUARD

Frank J. Fontana, Bridgeport, Conn., assignor to The Bassick Company, Bridgeport, Conn., a corporation of Connecticut Filed Sept. 17, 1958, Ser. No. 761,489

5 Claims. (Cl. 16—18)

This invention relates to caster structures and more particularly to an improved caster guard for use on casters associated with washing machines, ironing machines, office and other furniture having exposed legs, which are comparatively small in diameter.

Many machines or articles of furniture which include casters associated with the supporting means, have the caster so positioned that the person or the workpiece associated with the machine comes in constant contact with the casters. For instance, where the caster is associated with office furniture, there is a constant tendency for the office staff to kick the caster with either the heel or other portions of the person's shoe. The contact of the relatively soft leather shoe with the metal caster causes the shoe to become scuffed and damaged. Where the casters are associated with washing machines or ironing machines, there is a tendency for the articles being laundered to come in contact with the casters positioned upon the legs of these machines. Often, contact of the laundry material with the caster results in additional soiling of the laundered article and in some cases the article is torn or ripped upon the relatively sharp portions of the caster structure. To prevent damage to the person or to articles being used in conjunction with caster-supported devices, there have in the past, been provided protective guards which have been mounted on a caster to cover the caster wheel-supporting structure. However, where the caster guards have been formed integrally with the horn, such constructions are quite expensive since the horn is a relatively heavy piece of material and it is difficult to form the deep shapes required to provide a combined horn and guard structure. Where the protecting guard is formed as a separate element, the guard is in many cases, positioned upon the axis of the pintle thereby destroying the natural symmetry since the axis of the caster wheel is located normally in a different plane from that of the axis of the pintle. In addition, such guards were of necessity rather large and unattractive, and in many cases failed to completely cover the caster wheel and axle.

It is therefore the primary object of this invention to provide an improved guarded caster in which the guard provides greater protection against any damage to an article or person coming into contact with the caster structure.

It is a further object of this invention to provide an improved guarded caster in which the addition of the caster guard greatly improves the esthetic appearance of the caster structure as a whole.

It is another object of this invention to provide an improved guarded caster in which the guard is separately formed and is adapted to be centered on the same axle as that supporting the caster wheel.

It is a further object of this invention to provide an improved guarded caster in which the guard is so formed that it will give increased protection against foreign matter from collecting around the axle and wheel bearings.

It is an additional object of this invention to provide an improved guarded caster in which the guard may be more easily mounted upon a conventional caster structure, requiring less time, with resultant decrease in cost.

Other objects of this invention will be pointed out in the following detailed description and claims and illustrated in the accompanying drawing which discloses by way of example the principle of this invention and the best mode which has been contemplated of applying that principle.

Briefly, the present invention provides a single element, protecting guard which is formed as a segment of a spherical shell and is adapted to be positioned upon a conventional caster structure. The spherical guard is provided with a slot formed within the upper surface of the spherical member so that a conventional caster horn may be inserted within the slot. The spherical guard includes an open bottom portion so that the caster wheel may rotate freely, and is further provided with aligned apertures on either side of its spherical skirt so that a single caster axle may be inserted through these aligned apertures and apertures formed within the caster horn. The axle therefore positions the spherical guard upon the caster horn while at the same time positioning the caster wheel within the side portions of the horn member for rotation therein.

Figure 1:
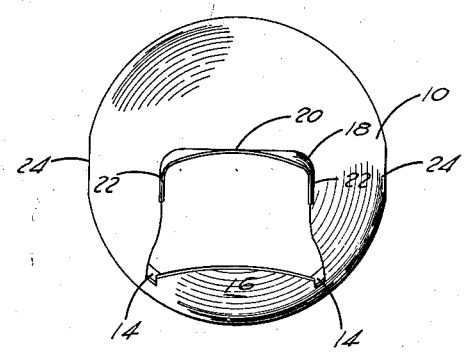
Figure 1 is a top view of the improved caster guard employing one embodiment of this invention.

Referring now to Figure 1, there is shown one embodiment of the present invention which includes a protecting guard 10 of sheet metal or the like. The guard 10 comprises a segment of a spherical shell and is of one-piece construction. The guard will be described as spherical throughout the remainder of the specification only to impart a designation of general configuration thereto. The guard 10 has formed therein, an opening 12 at the top of the guard member, the opening being formed off center for purposes which will be fully described later. The opening 12 is formed so as to include a pair of rather narrow extension portions or slots 14 at the forward end thereof. Between these narrow slots 14 there is further formed an inwardly directed tongue member 16. At the rear of the opening 12 toward the vertical axis of the spherical guard, there is provided an upstanding flange 18. The flange 18 is formed integral with the rest of the protecting guard 10 and may be formed of a portion of the metal which has been punched out to form the opening 12. The flange 18 includes a laterally extending rear portion 20 and a pair of forwardly directed side portions 22. The spherical protecting guard 10 is further provided with a pair of aligned apertures indicated generally at 24 along a horizontal axis through the spherical guard. The diameter of the aligned apertures are of a size sufficient to allow an axle 34 of the caster to be freely inserted within the apertures. The bottom of the spherical protecting guard is cut away at 26 to allow the caster wheel to contact the surface upon which it is to engage.

Figure 3:
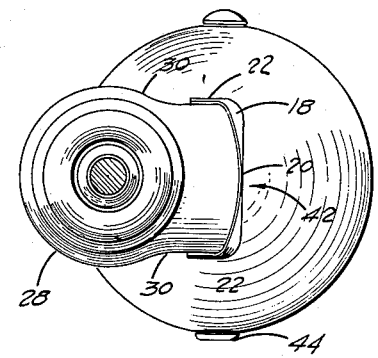
Figure 3 is a top view of a conventional caster structure employing one embodiment of this invention.
Figure 2:
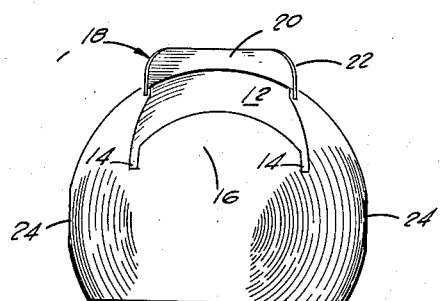
Figure 2 is a front elevational view of the embodiment shown in Figure 1.
Figure 4:
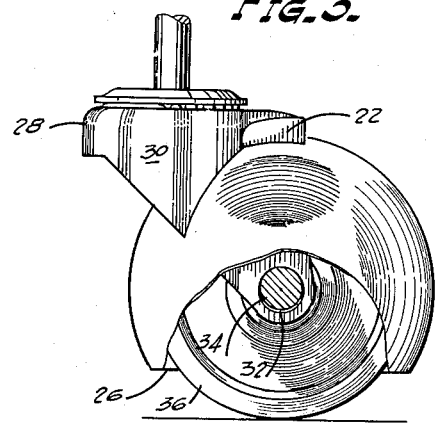
Figure 4 is a side elevational view of the caster structure shown in Figure 3.
Figure 5:
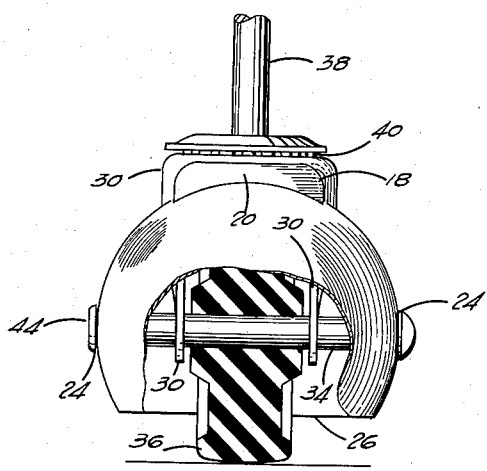
Figure 5 is a rear elevational view, partially in section, of the caster structure shown in Figures 3 and 4.

Referring now to Figures 3, 4, and 5 there is shown a conventional caster which makes use of one embodiment of the present invention. The caster includes a horn 28 having a pair of spaced, generally parallel, depending side portions 30, each of the side portions 30 having an aperture 32 therein which is adapted to receive the axle 34. A caster wheel 36 is mounted upon the axle 34 for rotation between the side portions 30 of the horn 28. The caster is further provided with a pintle 38 for mounting the caster upon its associated apparatus such as an article of furniture. The caster includes a conventional bearing structure 40 for allowing the horn to be rotatably connected to the pintle 38 in the manner of conventional swivel-type casters.

The protecting guard 10 of the present invention is adapted to be slidably mounted upon the caster horn 28 and to be rigidly secured thereon by means of axle 34.

During assembly of the caster and its associated protecting guard, the caster horn 28 is inserted within the opening 12 until the side portions 30 of horn 26 rest within the narrow slotted portions 14 on each side of the protecting guard 10. The inwardly directed tongue member 16 will then be positioned between the side portions 30 of horn 28 and will tend to prevent any foreign matter from entering the caster structure at this point. At the same time, the rear portion 20 of the upstanding flange 18 will have contacted a rear portion 42 of the caster horn 26. The side portions 22 are likewise frictionally engaged with corresponding portions of each of the side portions 30 of horn 28. The apertures 24 of the protecting guard 10 and the apertures 32 formed within each of the side portions 30 of the horn will then be aligned. At this time, the caster wheel 36 is inserted within the bottom opening 24 of the guard 10 between the horn side portions 30 so that axis of the wheel will also be aligned with apertures 24 and 32. Then the axle 34 is inserted within the aligned apertures and the opening formed within the center of the wheel as indicated from right to left in Figure 5. When the outer end 44 of the axle protrudes through the other side of the protecting guard, the axle 34 is then riveted at end 44 to hold the protecting guard rigidly in place upon the caster structure, while at the same time providing supporting means for the rotating caster wheel.

It can be readily seen from the above description that the improved protecting guard of the present invention is readily adaptable to conventional caster structures. The only changes necessary to adapt the guard to use with such conventional casters is the provision of a guard having a suitable opening within the upper portion to fit the caster in question and the replacement of the standard wheel axle with a somewhat elongated wheel axle. It is also apparent that the present improved caster guard provides a protective surface which substantially surrounds the rotating caster wheel and its associated support means, and the use of the particular spherical configuration allows a protecting guard which is of a relatively small size, but completely encircles the required moving parts. In addition, the over-all esthetic appearance of the caster structure is greatly enhanced by the utilization of the present improved protecting guard having a spherical configuration.

While there has been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:
1. A caster, comprising, a horn having a top portion and a pair of spaced, generally parallel, downwardly extending side portions having aligned, axle-receiving apertures spaced from the top portion, a caster wheel positioned within said side portions of said horn for rotation therein, a cup-shaped protecting guard extending downwardly over said wheel, said guard including structure defining an opening offset from the vertical axis of said guard adapted to receive said side portions of said horn with said structure engaging the side portions between the axle receiving apertures and top portion, said guard having aligned axle-receiving apertures, and a wheel axle passing through said wheel and through said aligned apertures of said horn and guard to secure said guard and horn together and to rotatably support said wheel on said axle.

2. The caster as claimed in claim 1 wherein said opening includes a pair of narrow, downwardly directed slots formed at either side of the lower edge of said opening adapted to receive and hold therein corresponding edges of said side portions to locate said protecting guard upon said horn.

3. The caster structure as claimed in claim 2 further including a generally upstanding flange portion formed adjacent the upper edge of said opening and adapted to contact the side portions opposite the corresponding edges when said protecting guard is mounted upon said caster.

4. In a caster having a horn with a top portion and spaced generally parallel downwardly protruding side portions having aligned apertures spaced from the top portion, an axle projecting through said aligned apertures, and a wheel mounted on the axle for rotation between the side portions for moving the caster along a supporting surface, an improved guard comprising a shell formed as a segment of a sphere by a chordal plane cutting said sphere, with the inside diameter of the shell being slightly larger than the diameter of the wheel, said shell having an opening offset from a diametrical axis perpendicular to the chordal plane and symmetrical about a diametrical plane perpendicular to the chordal plane, and including narrow slots extending away from the last-mentioned diametrical axis and being slightly wider than the thickness of the side portions for receiving and securing therein corresponding edges of said side portions between the top portion and the aligned apertures, and an outwardly projecting flange around the portion of the opening adjacent the last-mentioned diametrical axis for engaging the opposite edges of the side portions, said shell having aligned apertures on a diametrical axis perpendicular to the diametrical plane for receiving the ends of the axle to maintain the periphery of the opening in engagement with the side portions for securing the guard to the caster, with the chordal plane being parallel to the supporting surface to cover the upper part of the wheel, while presenting an exterior spherical surface having a diameter greater than the diameter of the wheel.

5. In a caster having a horn with a top portion and spaced generally parallel downwardly protruding side portions having aligned apertures spaced from the top portion, an axle extending through the aligned apertures, and a wheel mounted on the axle for rotation between the side portions for moving the caster along a supporting surface, an improved guard comprising a shell formed as a segment of a sphere by a chordal plane cutting said sphere, with the inside diameter of the shell being slightly larger than the diameter of the wheel, said shell having an opening including narrow slots slightly wider than the thickness of the side portions for receiving and securing therein corresponding edges of said side portions between the top portion and the aligned apertures, and an outwardly projecting flange around the periphery of the opening opposite the slots for engaging the opposite edges of the side portions, said shell having apertures on a diametrical axis parallel to the chordal plane for receiving the ends of the axle to maintain the periphery of the opening in engagement with the side portions for securing the guard to the caster, with the chordal plane being substantially parallel to the supporting surface to cover the upper part of the wheel, while presenting an exterior spherical surface having a diameter greater than the diameter of the wheel.

References Cited in the file of this patent

UNITED STATES PATENTS

| | | |
|---|---|---|
| 672,138 | Stockwell | Apr. 16, 1901 |
| 888,426 | Legge | May 19, 1908 |
| 2,129,579 | Herold | Sept. 6, 1938 |
| 2,583,241 | Shepherd | Sept. 27, 1949 |
| 2,659,100 | Cramer | Nov. 17, 1953 |
| 2,830,545 | Robinson et al. | Apr. 15, 1958 |